US009995446B2

(12) United States Patent
Powell

(10) Patent No.: US 9,995,446 B2
(45) Date of Patent: Jun. 12, 2018

(54) GROW LIGHT MATRIX SYSTEM INCORPORATING BLADE LIGHTING SYSTEM

(71) Applicant: Douglas H. Powell, El Dorado Hills, CA (US)

(72) Inventor: Douglas H. Powell, El Dorado Hills, CA (US)

(*) Notice: Subject to any disclaimer, the term of this patent is extended or adjusted under 35 U.S.C. 154(b) by 137 days.

(21) Appl. No.: 15/016,066

(22) Filed: Feb. 4, 2016

(65) Prior Publication Data
US 2017/0030537 A1 Feb. 2, 2017

Related U.S. Application Data

(63) Continuation-in-part of application No. 14/810,182, filed on Jul. 27, 2015.

(51) Int. Cl.
| F21S 8/06 | (2006.01) |
| A01G 7/04 | (2006.01) |
| A01G 9/26 | (2006.01) |
| F21S 2/00 | (2016.01) |
| F21Y 103/10 | (2016.01) |
| F21Y 115/10 | (2016.01) |

(52) U.S. Cl.
CPC .............. *F21S 8/061* (2013.01); *A01G 7/045* (2013.01); *A01G 9/26* (2013.01); *F21S 2/00* (2013.01); *F21Y 2103/10* (2016.08); *F21Y 2115/10* (2016.08); *Y02A 40/274* (2018.01); *Y02P 60/146* (2015.11)

(58) Field of Classification Search
CPC .............................. A01G 7/045; Y02P 60/149

USPC ..................................................... 47/58.1 LS
See application file for complete search history.

(56) References Cited

U.S. PATENT DOCUMENTS

| 3,931,695 | A | * | 1/1976 | Widmayer | ............. | A01G 7/045 47/17 |
| 4,255,897 | A | * | 3/1981 | Ruthner | ................. | A01G 7/045 47/17 |
| 5,276,598 | A | * | 1/1994 | Hedenstrom | ........... | G09F 9/307 362/238 |
| 6,076,944 | A | * | 6/2000 | Maranon | .................. | A01G 9/26 362/294 |
| 6,477,805 | B2 | * | 11/2002 | Ware | ...................... | A01G 31/02 47/83 |
| 2003/0089037 | A1 | * | 5/2003 | Ware | ...................... | A01G 31/02 47/83 |
| 2009/0272029 | A1 | * | 11/2009 | Aiking | ..................... | A01G 7/04 47/1.43 |
| 2010/0287830 | A1 | * | 11/2010 | Chen | ...................... | A01G 7/045 47/58.1 LS |
| 2012/0281413 | A1 | * | 11/2012 | Lewis | .................... | A01G 7/045 362/249.11 |
| 2013/0000185 | A1 | * | 1/2013 | Tanase | ................... | A01G 7/045 47/17 |

(Continued)

*Primary Examiner* — Joshua D Huson
(74) *Attorney, Agent, or Firm* — Dodd Call Black, PLLC; Dustin L. Call

(57) ABSTRACT

A lighting system for stimulating plant growth. The system includes a first blade. The first blade includes at least some of the light fixtures in the first array of light fixtures. The system additionally includes a second blade. The second blade includes at least some of the light fixtures in the second array of light fixtures. The system moreover includes a support. The support configured to receive the first blade and connect the first blade to a power supply.

21 Claims, 15 Drawing Sheets

(56) References Cited

U.S. PATENT DOCUMENTS

| | | | | |
|---|---|---|---|---|
| 2013/0063930 A1* | 3/2013 | Dubuc | A01G 9/24 | 362/145 |
| 2013/0067814 A1* | 3/2013 | Riley | A01G 31/02 | 47/62 R |
| 2013/0152864 A1* | 6/2013 | Grajcar | F21V 29/58 | 119/204 |
| 2013/0170211 A1* | 7/2013 | Lin | F21S 2/005 | 362/249.02 |
| 2013/0263503 A1* | 10/2013 | Bostdorff | A01G 7/045 | 47/58.1 LS |
| 2013/0283683 A1* | 10/2013 | Ringbom | A01G 9/26 | 47/58.1 LS |
| 2014/0000162 A1* | 1/2014 | Blank | A01G 31/06 | 47/62 A |
| 2014/0165468 A1* | 6/2014 | Roeser | A01G 9/12 | 47/62 R |
| 2015/0128489 A1* | 5/2015 | Yamada | A01G 7/045 | 47/58.1 LS |
| 2015/0150195 A1* | 6/2015 | Grajcar | A01G 7/045 | 47/58.1 LS |
| 2015/0223402 A1* | 8/2015 | Krijn | A01G 7/045 | 47/58.1 LS |
| 2015/0319933 A1* | 11/2015 | Li | A01G 1/001 | 47/58.1 LS |
| 2015/0351329 A1* | 12/2015 | Heidl | A01G 9/023 | 211/49.1 |
| 2016/0157439 A1* | 6/2016 | Greene | A01G 9/14 | 47/17 |
| 2016/0235014 A1* | 8/2016 | Donham | A01G 7/045 | |

* cited by examiner

GROW LIGHT MATRIX SYSTEM INCORPORATING BLADE LIGHTING SYSTEM

CROSS-REFERENCE TO RELATED APPLICATIONS

This application is a continuation in part of, and claims the benefit of and priority to, U.S. Non-Provisional patent application Ser. No. 14/810,182 filed on Jul. 27, 2015, which application is incorporated herein by reference in its entirety.

This application is related to co-pending U.S. application Ser. No. 15/016,063, filed on Feb. 4, 2016, and entitled, "GROW LIGHT MATRIX SYSTEM USING SPACERS TO MAINTAIN PROPER LIGHT POSITION", which application is incorporated herein by reference in its entirety.

This application is related to co-pending U.S. application Ser. No. 15/016,065, filed on Feb. 4, 2016, and entitled, "GROW LIGHT MATRIX SYSTEM USING DAISY CHAINS", which application is incorporated herein by reference in its entirety.

BACKGROUND OF THE INVENTION

Photosynthesis is a process used by plants and other organisms to convert light energy, normally from the Sun, into chemical energy that can be later released to fuel the organisms' activities. This chemical energy is stored in carbohydrate molecules, such as sugars, which are synthesized from carbon dioxide and water—hence the name photosynthesis, from the Greek φῶς, phōs, "light", and σύνθεσις, synthesis, "putting together." In most cases, oxygen is also released as a waste product. Most plants, most algae, and cyanobacteria perform photosynthesis; such organisms are called photoautotrophs. Photosynthesis maintains atmospheric oxygen levels and supplies all of the organic compounds and most of the energy necessary for life on Earth.

Although photosynthesis is performed differently by different species, the process always begins when energy from light is absorbed by proteins called reaction centers that contain green chlorophyll pigments. In plants, these proteins are held inside organelles called chloroplasts, which are most abundant in leaf cells. In these light-dependent reactions, some energy is used to strip electrons from suitable substances, such as water, producing oxygen gas. Furthermore, two further compounds are generated: reduced nicotinamide adenine dinucleotide phosphate (NADPH) and adenosine triphosphate (ATP), the "energy currency" of cells.

In plants, algae and cyanobacteria, sugars are produced by a subsequent sequence of light-independent reactions called the Calvin cycle, but some bacteria use different mechanisms, such as the reverse Krebs cycle. In the Calvin cycle, atmospheric carbon dioxide is incorporated into already existing organic carbon compounds, such as ribulose bisphosphate (RuBP). Using the ATP and NADPH produced by the light-dependent reactions, the resulting compounds are then reduced and removed to form further carbohydrates, such as glucose.

However, in nature the amount of photosynthesis that can occur within a single plant is limited. In particular, many of the green areas of a plant do not receive light throughout the entire day. This is due to a number of factors, including the rotation of the earth which changes the location of the sun relative to the plant. Therefore, the plant itself sometimes shades itself.

However, there are not any mechanisms to bypass photosynthesis. I.e., there aren't any processes that allow for conversion of electricity directly into biological molecules. Therefore, the only mechanism for stimulating plant growth with inadequate sunlight is to use power to produce light which is then used by the plants for photosynthesis. However, many of these systems suffer from the same drawbacks outlined above. I.e., they place lights above the plants. Therefore, the highest leaves in the plants cast shadows on lower leaves, leaving a portion of the plant which does not photosynthesize.

Accordingly, there is a need in the art for a system which can stimulate the growth of plants by maximizing the surface of the plant which is receiving light and, therefore, participating in photosynthesis. Additionally, there is a need in the art for a system which makes as much produced light as possible available for photosynthesis.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a lighting system for stimulating plant growth. The system includes three or more plants in a grow area, wherein the centers of least three of the three or more plants are not substantially coincident to a line located on any plane. The system also includes a first array of light fixtures and a second array of light fixtures. Each of the light fixtures in the first array of light fixtures and second array of light fixtures are positioned vertically such that at least a portion of each of the light fixtures is below the top of the three or more plants, are located such that each plant is exposed to the light from at least two of the light fixtures and are arranged in a flanking pattern around each plant. At least one of the light fixtures is positioned between at least two of the three or more plants. The system further includes a first blade. The first blade includes at least some of the light fixtures in the first array of light fixtures. The system additionally includes a second blade. The second blade includes at least some of the light fixtures in the second array of light fixtures. The system moreover includes a support. The support configured to receive the first blade and connect the first blade to a power supply.

Another example embodiment includes a lighting system for stimulating plant growth. The system includes three or more plants in a grow area, wherein the centers of least three of the three or more plants are not substantially coincident to a line located on any plane. The system also includes a first array of light fixtures and a second array of light fixtures. Each of the light fixtures in the first array of light fixtures and second array of light fixtures are positioned vertically such that at least a portion of each of the light fixtures is below the top of the three or more plants, are located such that each plant is exposed to the light from at least two of the light fixtures, are arranged in a flanking pattern around each plant and provide 360 degrees of light to each of the three or more plants. At least one of the light fixtures is positioned between at least two of the three or more plants and provides light to at least two of the three or more plants. The system further includes a first blade. The first blade includes at least some of the light fixtures in the first array of light fixtures. The system additionally includes a second blade. The second blade includes at least some of the light fixtures in the second array of light fixtures. The system moreover includes a first support. The first support configured to receive the first blade and connect the first blade to a power supply. The system moreover includes a second support. The second support configured to receive the second blade and connect the second blade to a power supply.

Another example embodiment includes a method for arranging plants and light fixtures to stimulate plant growth. The method includes placing three or more plants in a grow area, wherein the centers of least three of the three or more plants are not substantially coincident to a line located on any plane. The method also includes placing a first array of light fixtures and placing a second array of light fixtures. Each of the light fixtures in the first array of light fixtures and second array of light fixtures are positioned vertically such that at least a portion of each of the light fixtures is below the top of the three or more plants, are located such that each plant is exposed to the light from at least two of the light fixtures, are arranged in a flanking pattern around each plant and provide 360 degrees of light to each of the three or more plants. At least one of the light fixtures is located between at least two of the three or more plants and provides light to at least two of the three or more plants. The method further includes placing a first blade. The first blade includes at least some of the light fixtures in the first array of light fixtures. The system additionally includes placing a second blade. The second blade includes at least some of the light fixtures in the second array of light fixtures. The method additionally includes providing power to the light fixtures according to a predetermined schedule.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
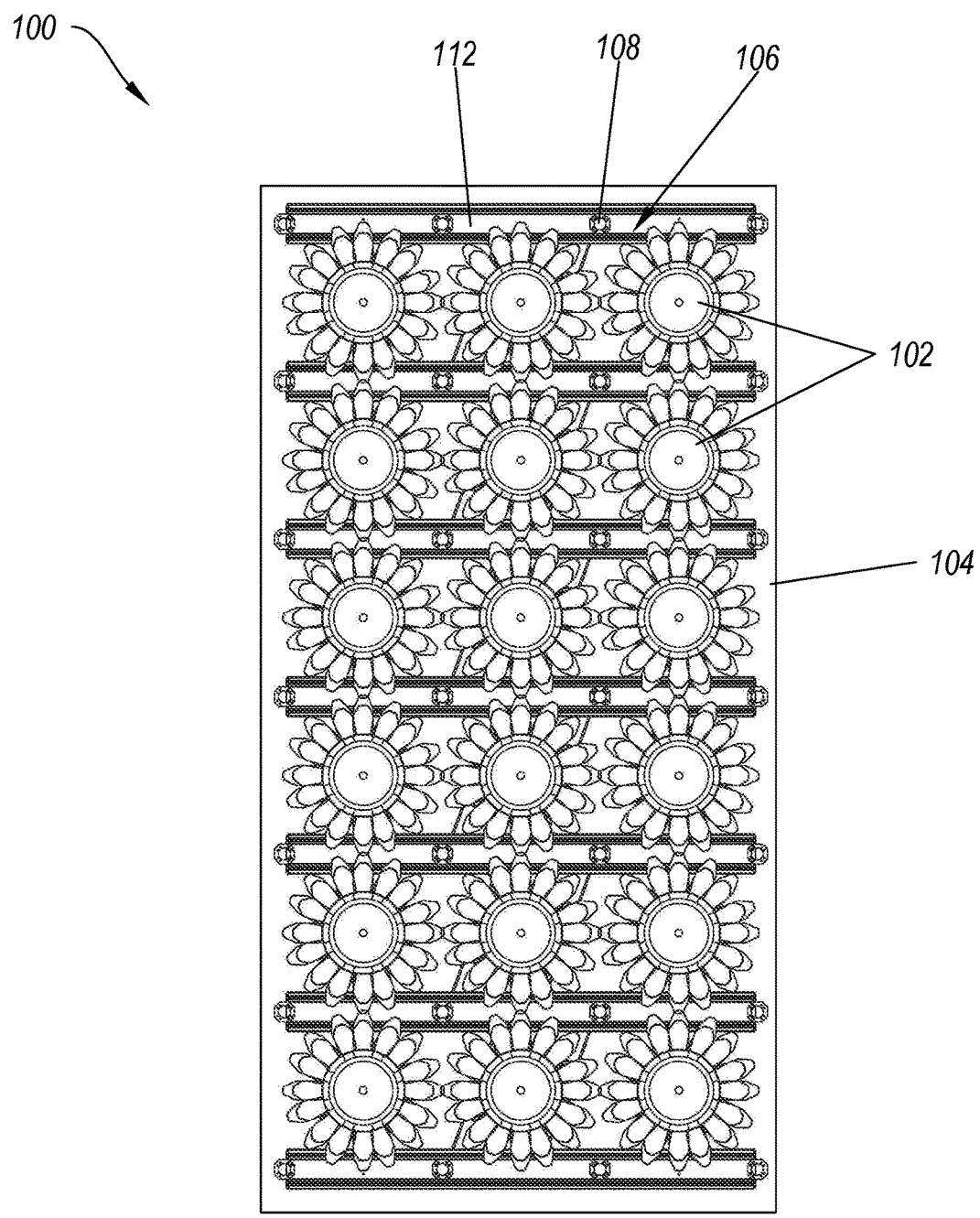
FIG. 1A illustrates a top view of the example of a grow light matrix system.
Figure 1B:
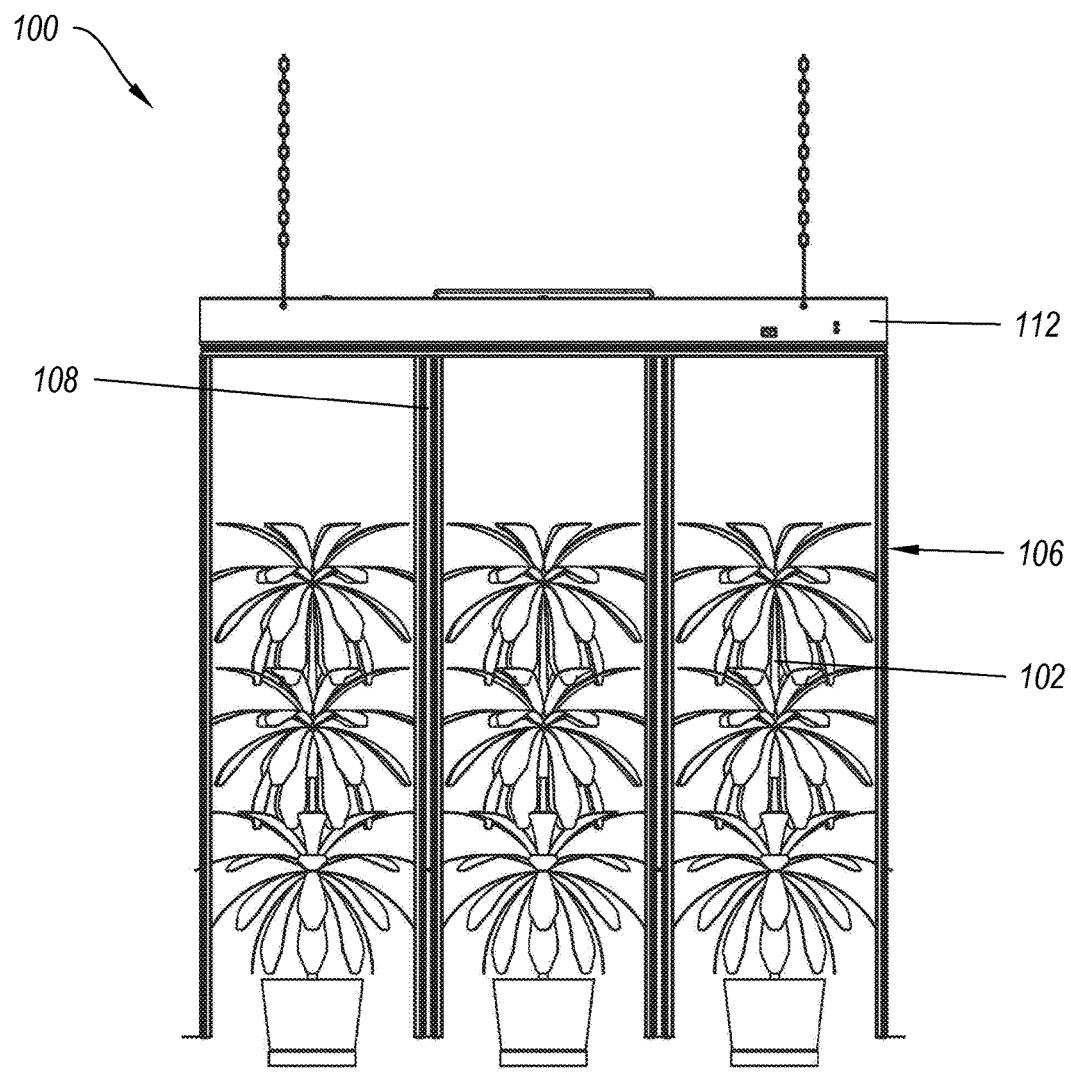
FIG. 1B illustrates a side view of the example of a grow light matrix system.
Figure 1C:
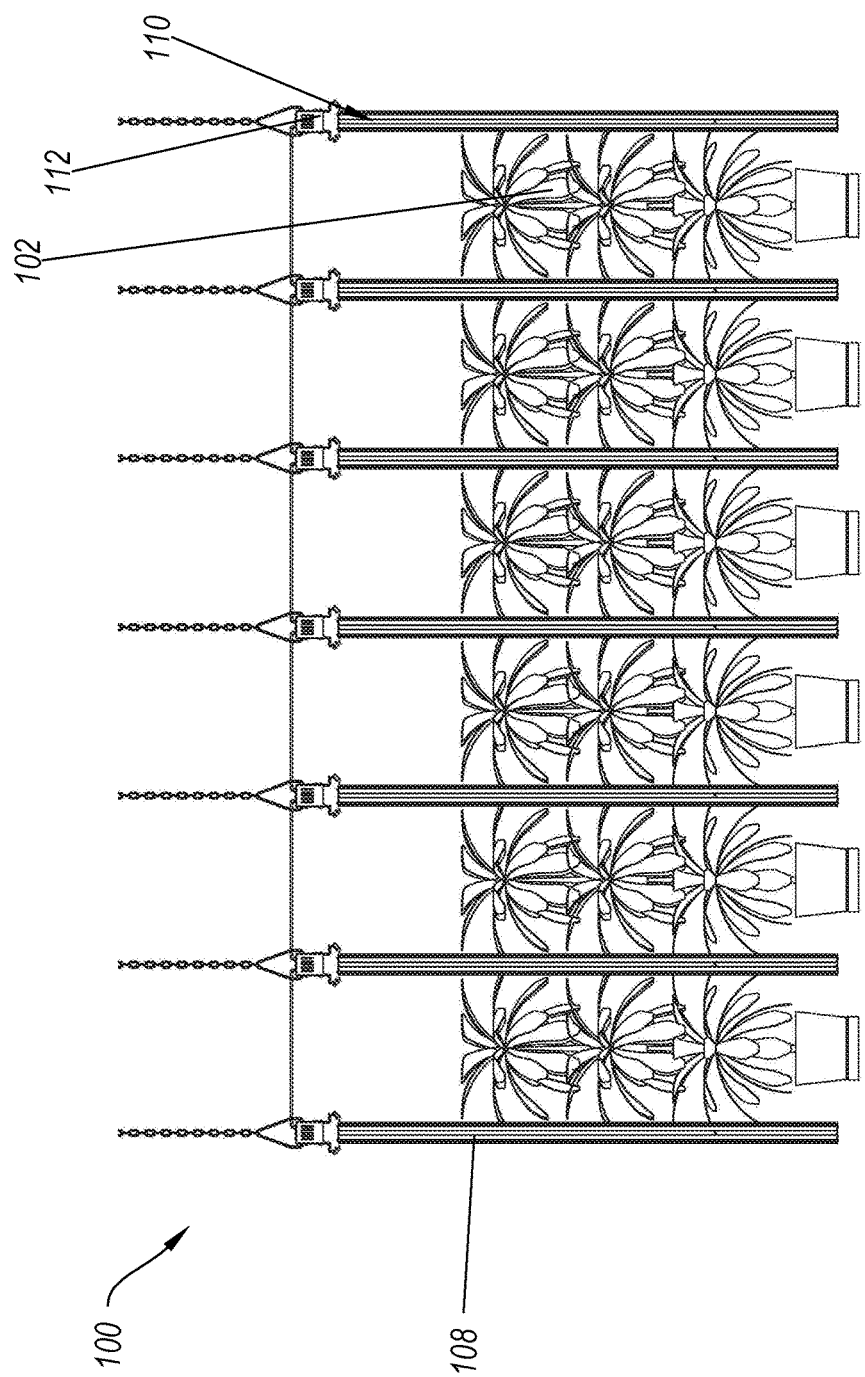
FIG. 1C illustrates a front view of the example of a grow light matrix system.
Figure 1D:
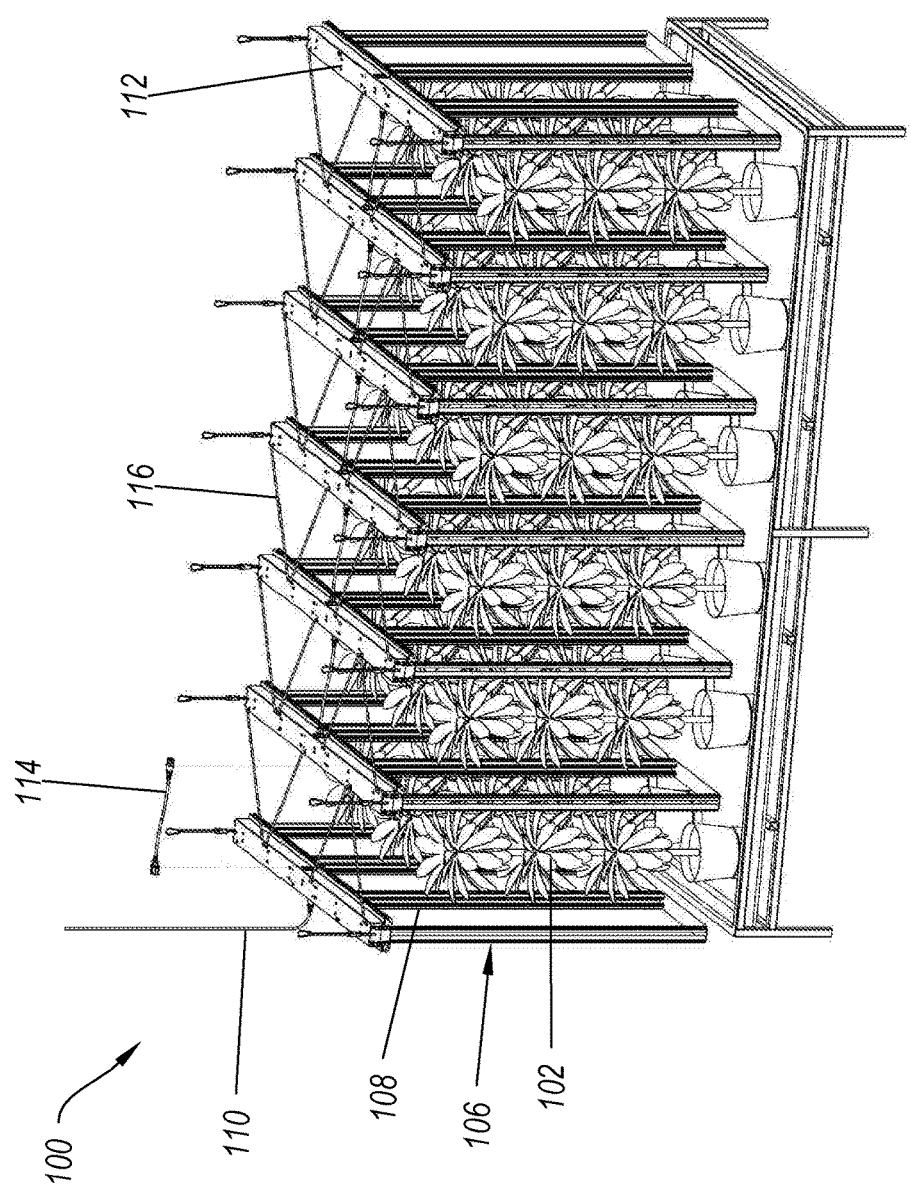
FIG. 1D illustrates a perspective view of the example of a grow light matrix system.

FIGS. 1A, 1B, 1C and 1D (collectively "FIG. 1") illustrate an example of a grow light matrix system 100. FIG. 1A illustrates a top view of the example of a grow light matrix system 100; FIG. 1B illustrates a side view of the example of a grow light matrix system 100; FIG. 1C illustrates a front view of the example of a grow light matrix system 100; and FIG. 1D illustrates a perspective view of the example of a grow light matrix system 100. The system 100 stimulates the growth potential of the plants. In particular, light is delivered to the plants in a manner that allows all photosynthesizing surfaces to receive light which allows the plant to reach greater growth. The grow light matrix system 100 can be arranged in different patterns depending on the light penetration desired within the plants.

FIG. 1 shows that the system 100 can include three or more plants 102. The plants 102, also called green plants (Viridiplantae in Latin), are multicellular eukaryotes of the kingdom Plantae. They form a clade that includes the flowering plants, conifers and other gymnosperms, ferns, clubmosses, hornworts, liverworts, mosses and the green algae. Plants 102 exclude the red and brown algae, the fungi, archaea, bacteria and animals. Green plants 102 have cell walls with cellulose and characteristically obtain most of their energy from sunlight via photosynthesis by primary chloroplasts, derived from endosymbiosis with cyanobacteria. Their chloroplasts contain chlorophylls a and b which gives them their green color. Plants 102 are also characterized by sexual reproduction, modular and indeterminate growth, and an alternation of generations, although asexual reproduction is also common. The three or more plants 102 can be arranged in any desired pattern. For example, FIG. 1 shows the three or more plants 102 arranged in 3 by 6 grid. Other patterns, such as a 4 by 8 grid, may also be achieved.

FIG. 1 also shows that the three or more plants 102 are located in a grow area 104. The grow area 104 can include any area that is configured to receive the three or more plants 102. For example, the grow area 104 can include a garden bed, a series of pots, a water tank (such as for aquaponics or hydroponics) or any other area that can receive the three or more plants 102. The grow area 104 can include one or more features that allow for controlling the environment around the three or more plants 102. For example, the grow area 104 can be located in a grow house which includes a building or housing that separates the grow area from the surrounding environment. That is, the grow house can include walls, roofs or other structures that prevent the outside weather from having an effect on the environment of the grow area 104.

FIG. 1 further shows that the system 100 can include an array of light fixtures 106. The array of light fixtures 106 includes a number of individual light fixtures 108 that are intended to stimulate growth of the plants 102. For example, the light fixtures 108 should have a high enough intensity to that the plants 102 can photosynthesize. Additionally or alternatively, the light fixtures 108 should be low temperature fixtures 108, such as LEDs and compact fluorescents, otherwise they can overheat and damage the plants 102. The light fixtures 108 can be arranged in any desired pattern. For example, FIG. 1 shows the light fixtures 108 arranged in 4 by 7 grid. Other patterns, such as a 5 by 9 grid, may also be achieved.

For example, FIG. 1 shows that the light fixtures 108 can include one or more vertical rods. That is, each light fixture is a rod that radiates light laterally in all directions. This means that light reaches the plants 102 from multiple directions.

In order to stimulate growth of the plants 102, the light fixtures 108 are positioned by the array of light fixtures 106 vertically such that at least a portion of each of the light fixtures 108 is at or below the top of the three or more plants 102. That is, at least some of the light emitting portion of the light fixture is below the top of each of the three or more plants 102. This allows the light to both reach leaves that are below the top of the plant, leaves which would receive little or no light in either a natural environment or a grow area with only overhead lights, and allows light to reach the bottom of upper leaves, which increases the photosynthesizing surface of the three or more plants 102.

Likewise, the light fixtures 108 are located such that each plant is exposed to the light from at least three of the light fixtures 108 and are arranged in a flanking pattern around each plant. This further increases the surface area of the three or more plants 102 which is photosynthesizing. In particular, the light fixtures 108 may provide 360 degrees of light to each of the three or more plants. This allows many of the plants "green" surfaces to continually photosynthesize, whereas in a natural environment some or all green surfaces are, at various times, not exposed to light and photosynthesis cannot occur. Moreover, at least one of the light fixtures 108 is located between at least two of the three or more plants 102 and provides light to at least two of the three or more plants. A flanking pattern means that the light fixtures 108 are to the side of each of the three or more plants 102. In particular, a flanking pattern as used herein means to place a light fixture 108 on each side of the three or more plants 102 such that the light fixtures 108 substantially surround each of the three or more plants 102. The flanking pattern may or may not be symmetrical about each of the three or more plants 102 in a horizontal plane.

Having three or more plants 102 can be critical to maximize the use of light by the plants 102. That is, since many light fixtures 108 will radiate light in multiple directions it is critical for the light fixtures 108 to supply light to more than one plant 102. I.e., efficiency is maximized when as much light as possible from each light fixture reaches a plant 102. Therefore, having three or more plants 102 allows for greater efficiency as a greater percentage of light fixtures 108 are stimulating growth in multiple plants 102.

FIG. 1 also shows that the system 100 can include a power supply 110. The power supply 110 supplies power to the array of light fixtures 106. The power supply 110 can include wiring that directly connects to a power supply of a building. Alternatively, the power supply 110 can include a power cord which allows the system 100 to be plugged into an outlet. The power supply 110 can be permanently attached or can be removable, as desired.

FIG. 1 further shows that the system 100 can include one or more supports 112. The supports 112 are configured to allow the array of light fixtures 106 to be hung from a ceiling. That is, the supports 112 hang the array of light fixtures 106 in the configuration described above. The supports 112 can be a single unit with the power supply 110 or can be a separate unit, as desired. For example, the supports 112 can include a ballast or other power source. An electrical ballast is a device intended to limit the amount of current in an electric circuit. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 1 additionally shows that the system 100 can include one or more daisy chains 114. A daisy chain 114 is a wiring scheme in which multiple devices are wired together in sequence or in a ring. Thus, the daisy chains 114 allow multiple arrays of light fixtures 106 to be connected to a single power supply 110. I.e., the daisy chains 114 create a single power supply which can be used to connect multiple arrays of light fixtures 106. Each array of light fixtures 106 can then draw power from the power supply created by the daisy chains 114. For example, the daisy chains 114 can carry power from the first array of light fixtures 106 to the second array of light fixtures 106, from the second array of light fixtures 106 to the third array of light fixtures 106, etc.

FIG. 1 moreover shows that the system 100 can include one or more spacers 116. The spacers 116 allow for ease in keeping the arrays of light fixtures 106 a desired distance from one another. I.e., since the supports 112 are hanging from a ceiling or other structure, the distance between them may vary slightly. The spacers 116 are rigid enough to maintain the optimal distance for plant growth between the arrays of light fixtures 106.

Figure 2:
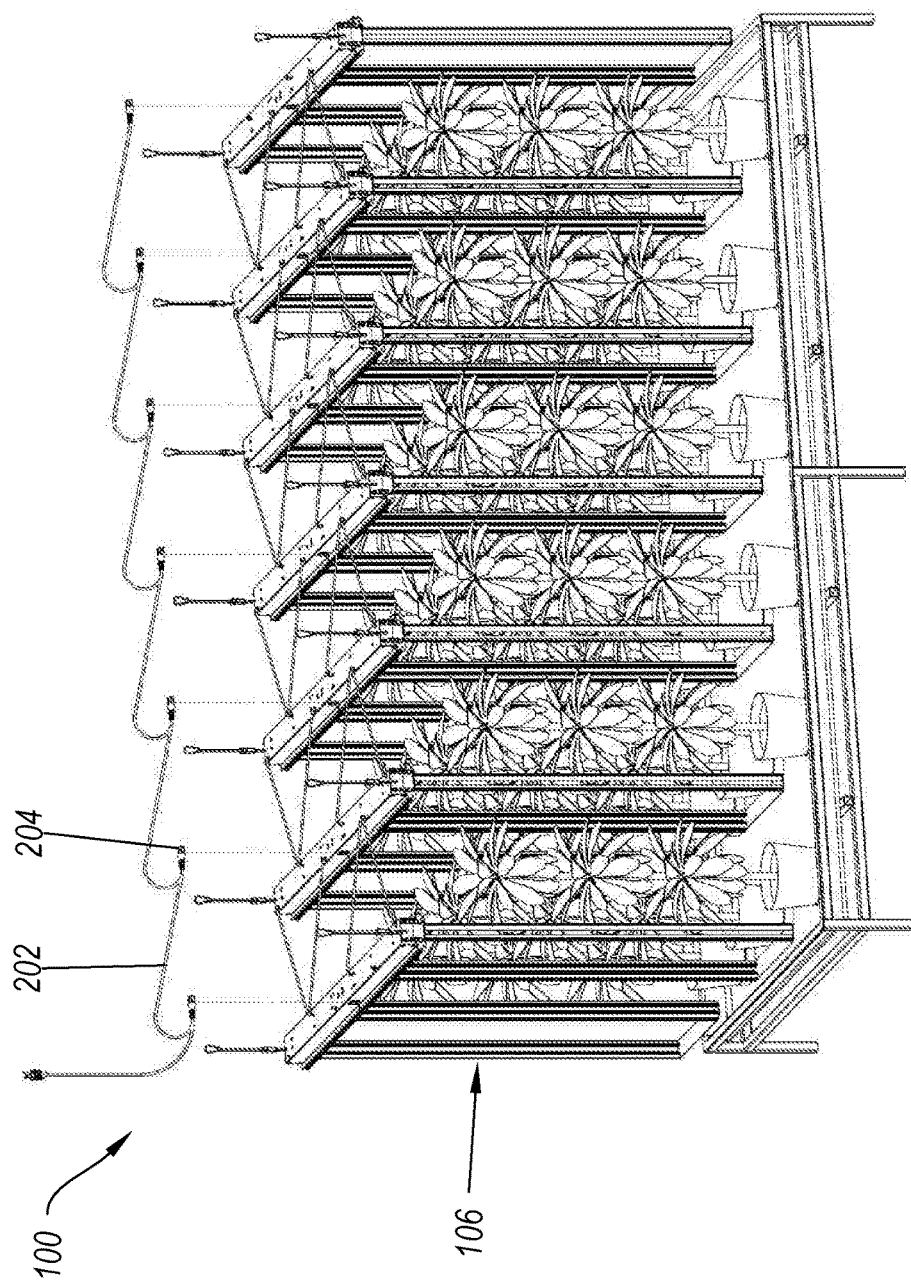
FIG. 2 illustrates an alternative example a grow light matrix system.

FIG. 2 illustrates an alternative example a grow light matrix system 100. The system 100 includes a parallel daisy chain 202. The parallel daisy chain 202 includes a plug 204 that can be connected to a socket in the array of light fixtures 106 and can have both an input for receiving power and an output for providing power (e.g., to another daisy chain 202). That is the daisy chain 202 receives power that can be connected to an array of light fixtures 106. However, the daisy chain 202 can also pass power to the next daisy chain 202 in the sequence, allowing a single power source to provide power to multiple arrays of light fixtures 106.

Figure 3:
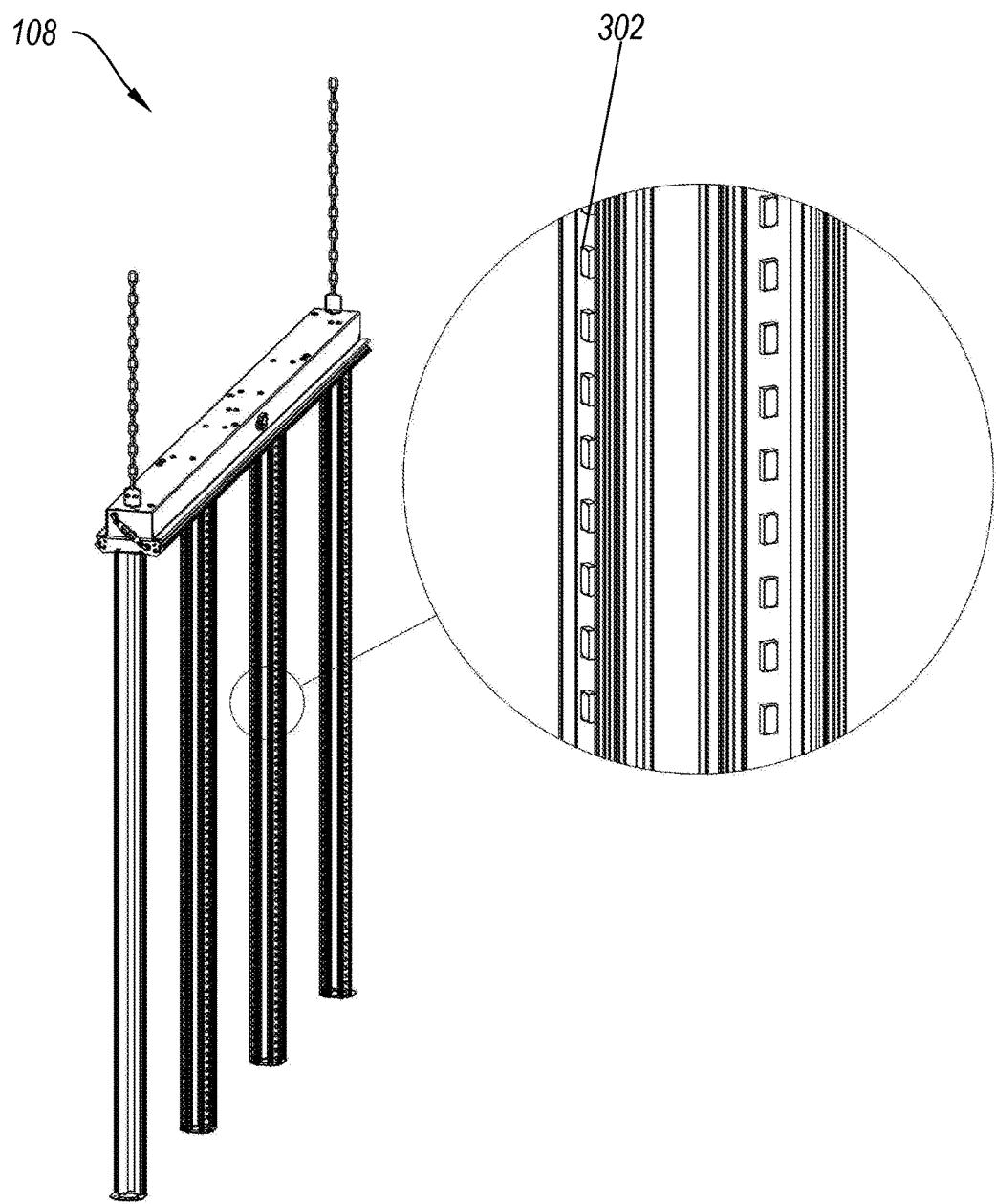
FIG. 3 illustrates an example of a light fixture configured as a vertical rod.

FIG. 3 illustrates an example of a light fixture 108 configured as a vertical rod. That is, the light fixture 108 acts as a vertical rod even though it is not explicitly a vertical rod. Thus, the light fixture 108 provides the benefits of a vertical rod, such as 360 degrees of light in a horizontal plane, without the need to build a vertical rod.

FIG. 3 shows that the light fixture 108 can include a vertical light bar 302. The vertical light bar 302 is a series of lights arranged in a linear fashion. However, the lights do not emit light through all 360 degrees of the horizontal plane. For example, the light may only be emitted through 90 degrees or 120 degrees of the horizontal plane. Therefore, three or four light bars 302 arranged around a common center can be used to approximate a vertical rod.

Figure 4A:
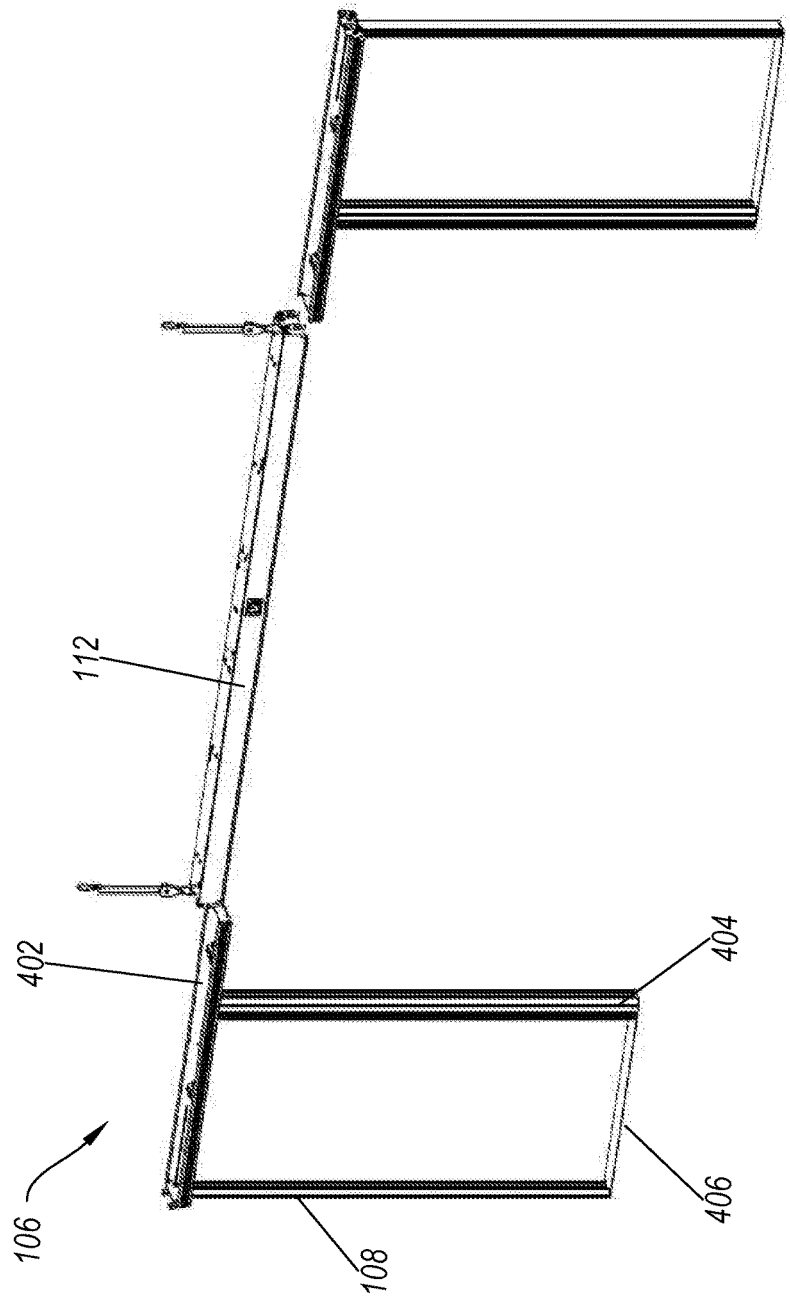
FIG. 4A illustrates an exploded view of the example of an array of light fixtures.
Figure 4B:
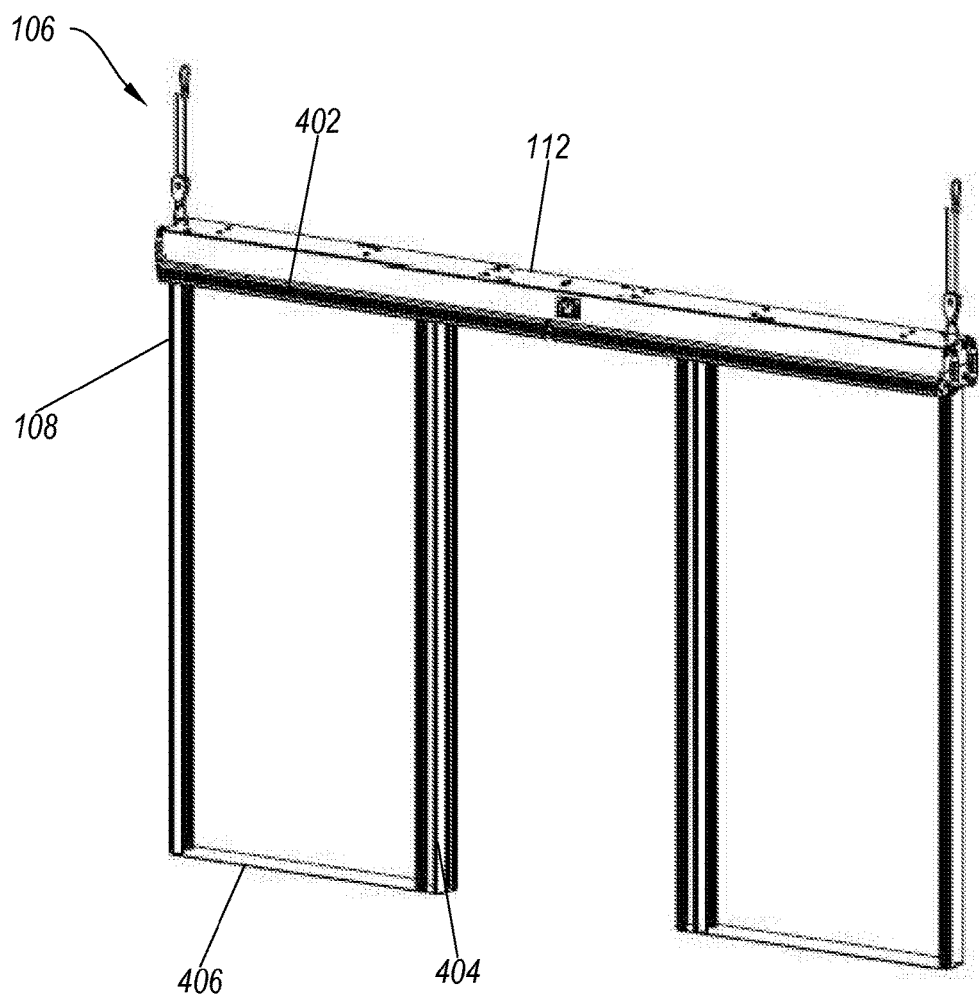
FIG. 4B illustrates an assembled view of the example of an array of light fixtures.

FIGS. 4A and 4B (collectively "FIG. 4") illustrate an example of an array of light fixtures 106. FIG. 4A illustrates an exploded view of the example of an array of light fixtures 106; and FIG. 4B illustrates an assembled view of the example of an array of light fixtures 106. The array of light fixtures may be disassembled for transport or storage. In particular, by disassembling the array of light fixtures 106, the space needed for transportation and/or storage may be greatly reduced.

FIG. 4 shows that the array of light fixtures 106 can include a blade 402. The blade 402 can be inserted into the support 112. For example, the support 112 can include a track or other mechanism for receiving the blade 402. Having the blade 402 in multiple pieces allows for ease of installation (as the weight of each piece is reduced) and shipping. Likewise, multiple pieces allow for easier maintenance. For example, if a piece is damaged, it can be removed and a replacement inserted to minimize reduction in plant grow time. Once the blade 402 is inserted in the support 112, the weight of the blade 402 is supported by the support 112. Additionally or alternatively, power can be supplied to the blade 402 by the support 112. For example, part or all of the track of the support 112, or some other mechanism with the support, such as a plug, can establish an electrical connection with the blade 402.

FIG. 4 also shows that the blade 402 can a vertical rod 404 of lights. I.e., the blade 402 is not a panel light, but can include vertical rods that can be collectively placed to facilitate easier installation and maintenance. The length of the vertical rod can be any desired length. For example, the rods can be 24 inches, 32 inches, 40 inches, 48 inches, or any other desired length. Additionally or alternatively, as vertical rods the light pattern of the blade can be customized to specific needs. For example, if the blade 402 includes the end of a row, the vertical rod at the end of the row may be switched off so that light (and the energy required to create the light) is not wasted. Likewise, one "surface" of the blade 402 can be turned off. I.e., as shown in FIG. 4, light can be produced in the direction of the front of the image while no light is produced in the direction of the rear of the image. This customization can be done using any standard technique in the art, such as the use of switches, transistors, etc.

FIG. 4 further shows that the blade 402 can include a spacer 406 between the light fixtures 108. The spacer 406 can maintain the distance between the light fixtures 108 in the array of light fixtures 106. Thus, horizontal movement of the light fixtures 108 relative to one another is reduced or eliminated.

Figure 5A:
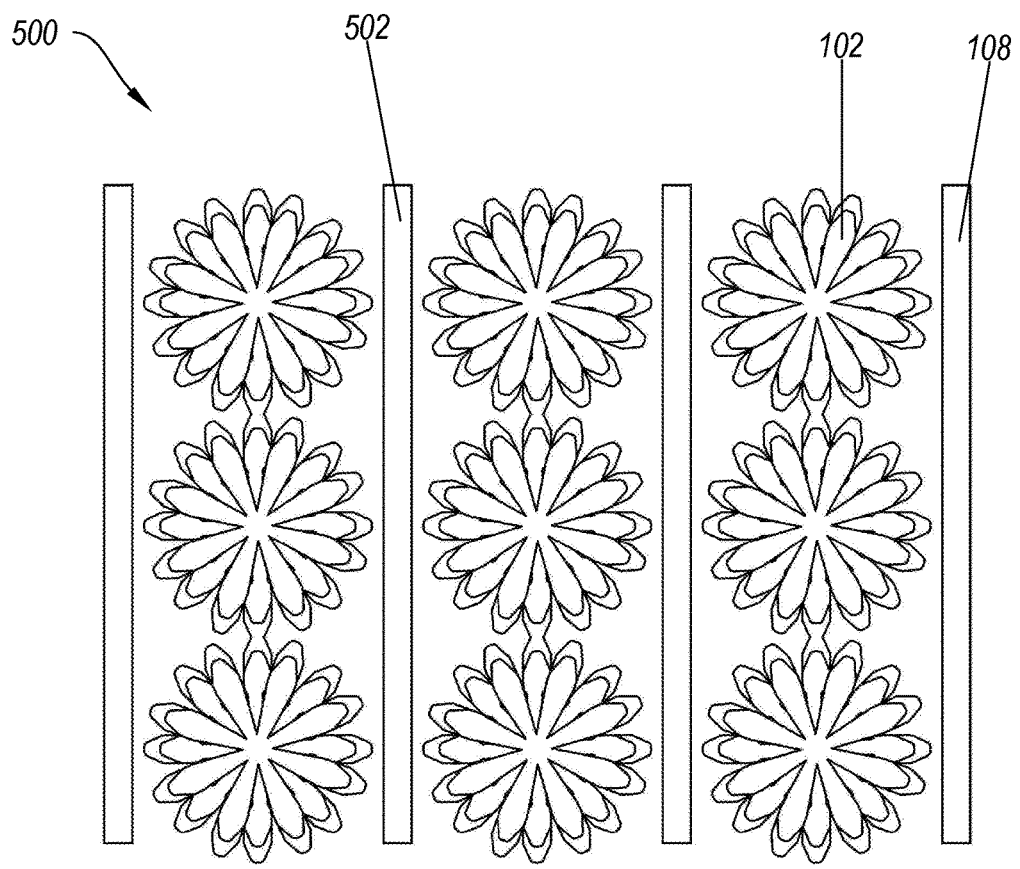
FIG. 5A illustrates a top view of the example of a linear matrix.
Figure 5B:
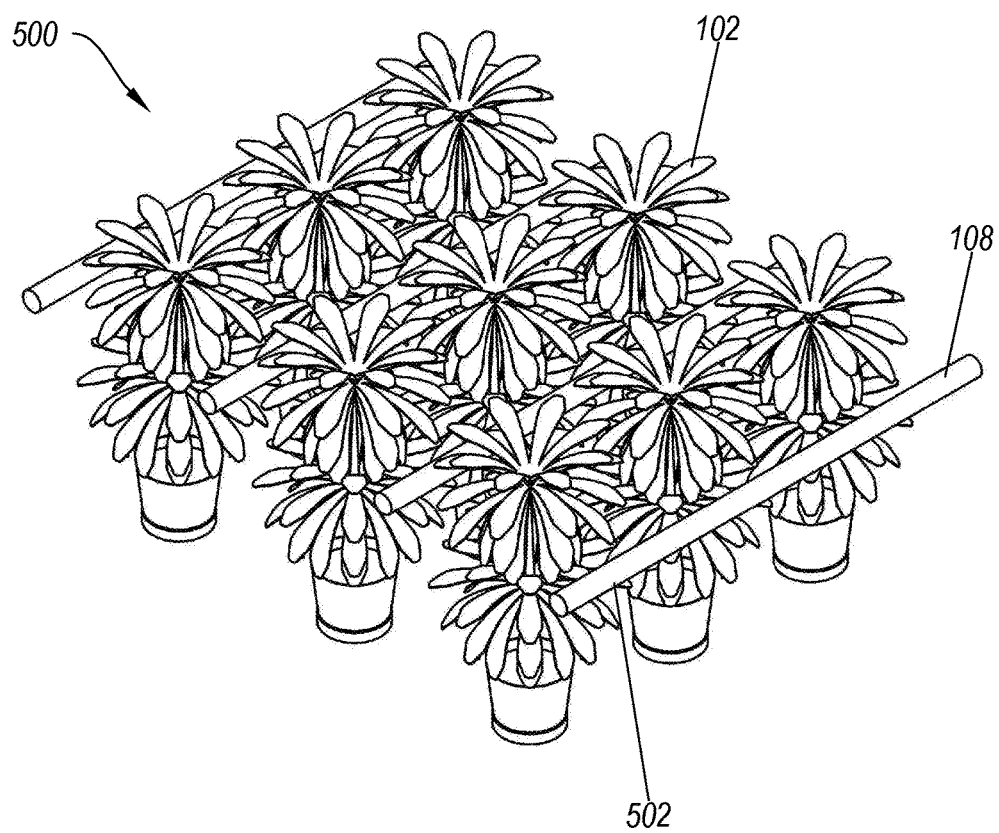
FIG. 5B illustrates a perspective view of the example of a linear matrix.

FIGS. 5A and 5B (collectively "FIG. 5") illustrate an example of a linear matrix 500. FIG. 5A illustrates a top view of the example of a linear matrix 500; and FIG. 5B illustrates a perspective view of the example of a linear matrix 500. A linear matrix is an arrangement of the three or more plants 102 in a line with the light fixtures 108 directly in between the plants 102 and at the end of each line. That is, the plants 102 and light fixtures 108 form a straight line with one another. The linear matrix can be signified using the notation [light fixture-plant]$_n$-light fixture, wherein n is any positive integer greater than 2.

FIG. 5 shows that the linear matrix 500 can include one or more horizontal rods 502. That is, each light fixture is a rod that radiates light in all vertical directions. This means that light reaches the plants 102 from multiple directions. The horizontal rods 502 can include linear lights configured as a horizontal rod, as described above in FIG. 3 with regard to vertical rods.

Figure 6A:
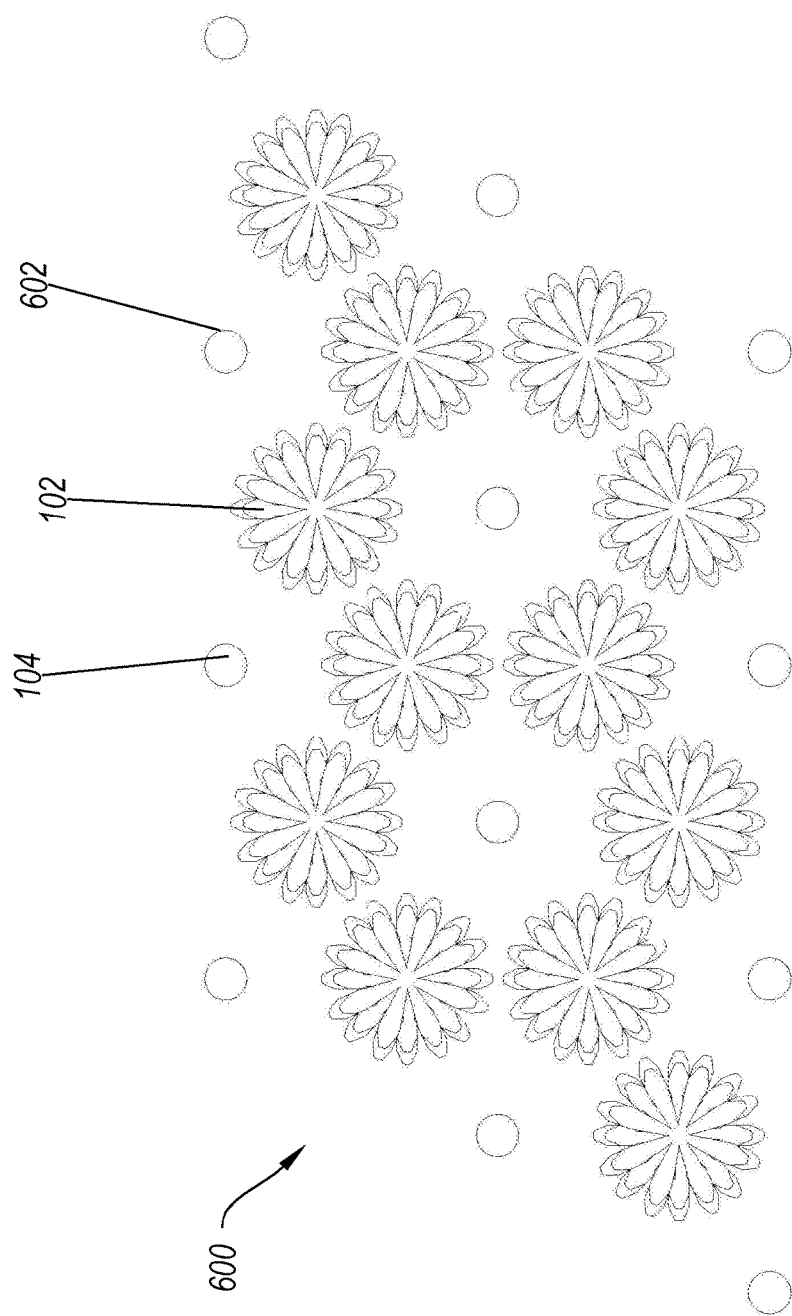
FIG. 6A illustrates a top view of the example of a triangle matrix.
Figure 6B:
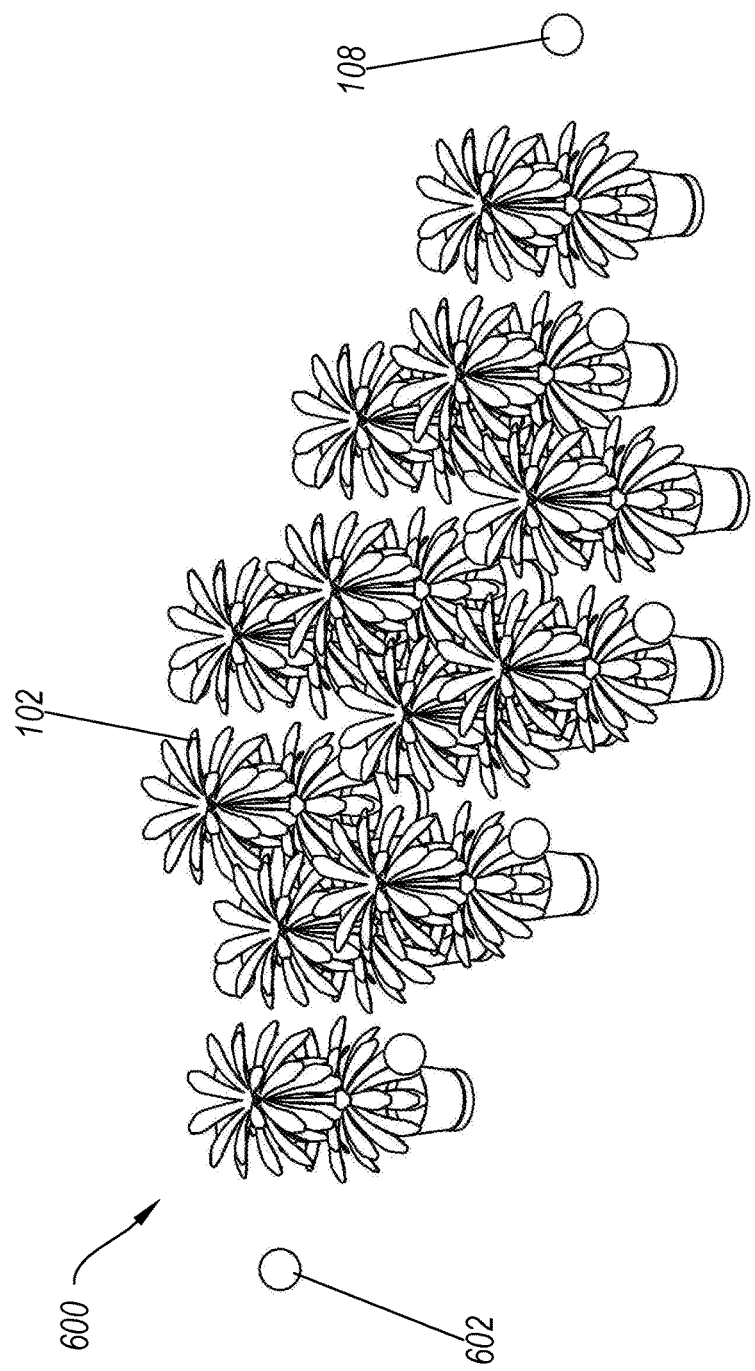
FIG. 6B illustrates a perspective view of the example of a triangle matrix.

FIGS. 6A and 6B (collectively "FIG. 6") illustrate an example of a triangle matrix 600. FIG. 6A illustrates a top view of the example of a triangle matrix 600; and FIG. 6B illustrates a perspective view of the example of a triangle matrix 600. A triangle matrix is an arrangement of the three or more plants 102 such that each plant has exactly three light fixtures 1018 arranged about the plant 102. That is, the light fixtures 108 form a triangle surrounding each the plants 102. To maximize the number of plants 102 within the grow area the triangle matrix can include plants arranged in a hexagonal pattern with a light fixture 108 at the center of each hexagon.

FIG. 6 shows that the triangle matrix 600 can include one or more globe lights 602. That is, each light fixture 108 radiates in all directions in a spherical pattern. Globe lights 602 can be used to ensure that as many green surfaces of the plants 102 can be photosynthesizing. This means that light reaches the plant 102 from multiple directions.

Figure 7A:
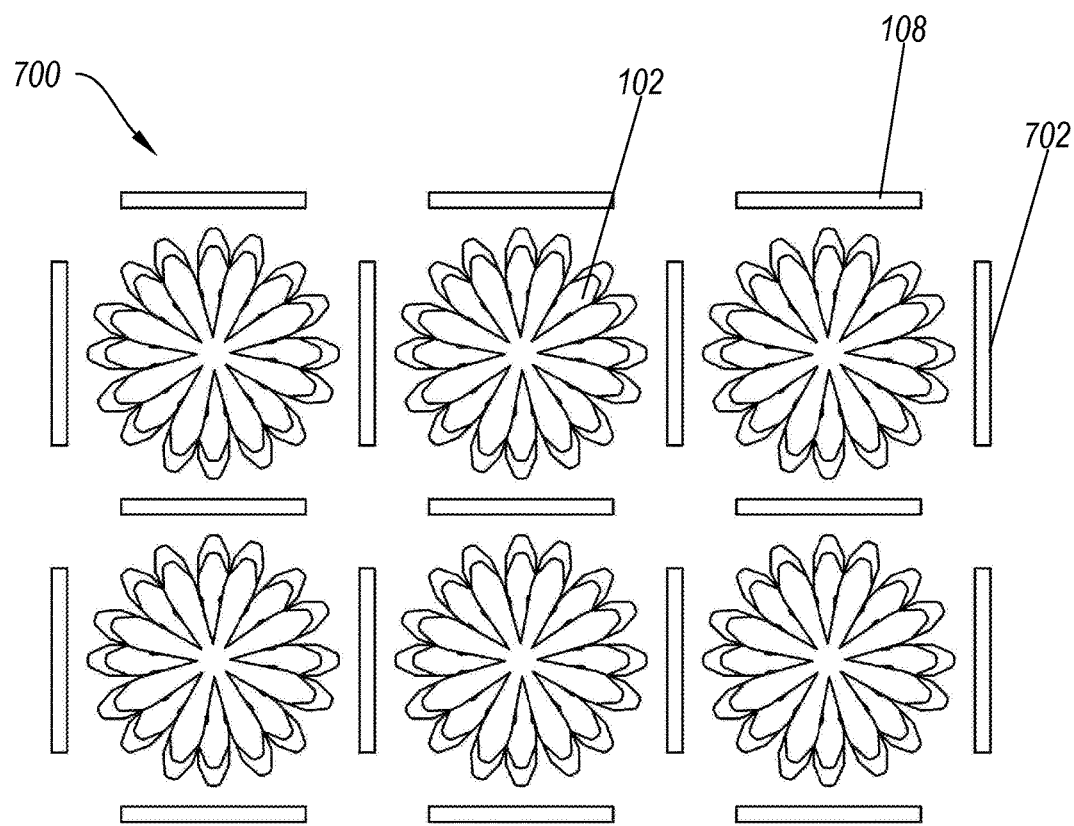
FIG. 7A illustrates a top view of the example of a square matrix.
Figure 7B:
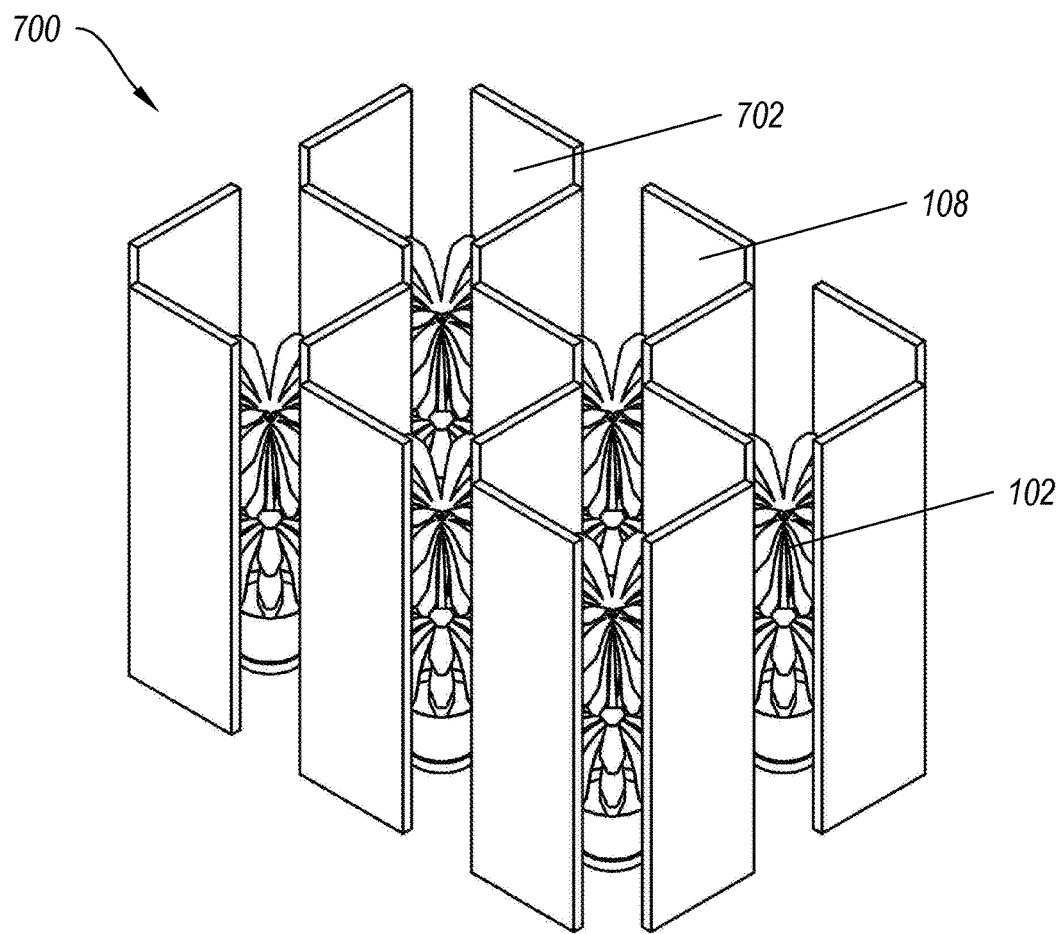
FIG. 7B illustrates a perspective view of the example of a square matrix.

FIGS. 7A and 7B (collectively "FIG. 7") illustrate an example of a square matrix 700. FIG. 7A illustrates a top view of the example of a square matrix 700; and FIG. 7B illustrates a perspective view of the example of a square matrix 700. A square matrix is an arrangement of the three or more plants 102 with four light fixtures 108 arranged around each plant 102. For example, the square matrix 700 can include a line with the light fixtures 108 directly in between the plants 102 and at the end of each line and between the rows of plants 102. I.e., a square matrix 700 can include multiple linear matrices with light fixtures between plants 102 in adjoining rows of plants 102. That is, the plants 102 and light fixtures 108 form a square line with one another.

FIG. 7 shows that the linear matrix 700 can include one or more panel lights 702. That is, each light fixture 108 is a flat sheet placed where one or more surfaces of the sheet radiate light used by the three or more plants for photosynthesis. Panel lights 702 can be used to ensure that more light is radiating linearly from the light fixture 108. That is, arranging the light fixture 108 as a panel allows for most radiation of light to occur in two opposite horizontal directions whereas the perpendicular directions receive little or no light. This means that light reaches the plant from two or more directions (but may not surround the plant 360 degrees).

One of skill in the art will appreciate that different light fixtures may be used with different matrices than the examples used herein. For example, the linear matrix 500 of FIG. 5 may be used with globes lights, vertical rods, panel lights or any other desired light fixture. Likewise, horizontal rods 502 of FIG. 5 may be used with a triangle matrix, square matrix or any other desired plant arrangement.

Figure 8:
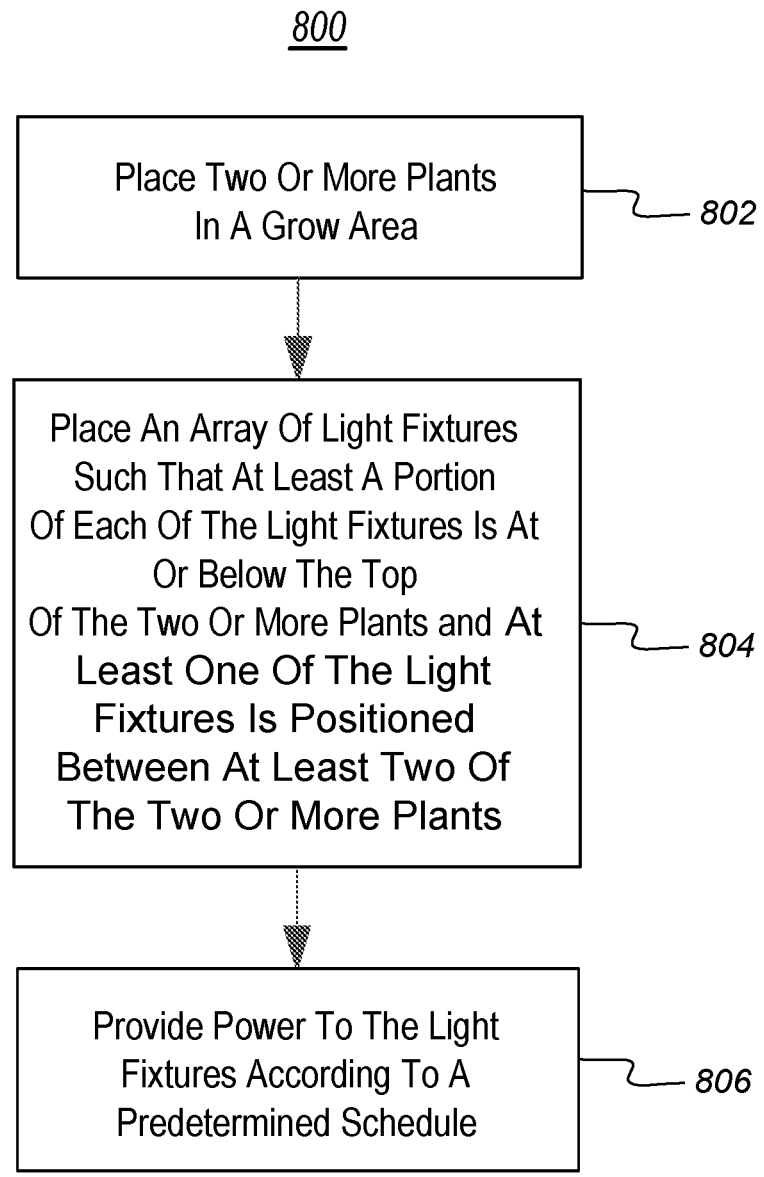
FIG. 8 is a flow chart illustrating a method for arranging plants and light fixtures to stimulate plant growth.

FIG. 8 is a flow chart illustrating a method 800 for arranging plants and light fixtures to stimulate plant growth. In at least one implementation, the arrangement of plants and light fixtures can include the grow light matrix system 100 of FIGS. 1-7. Therefore, the method 800 will be described, exemplarily, with reference to the grow light matrix system 100 of FIGS. 1-7. Nevertheless, one of skill in the art can appreciate that the method 800 can be used with an arrangement other than the grow light matrix system 100 of FIGS. 1-7.

FIG. 8 shows that the method 800 can include placing 802 three or more plants in a grow area. The grow area can include any area that is configured to receive the three or more plants. For example, the grow area can include a garden bed, a series of pots, a water tank (such as for aquaponics or hydroponics) or any other area that can receive the three or more plants. The grow area can include one or more features that allow for controlling the environment around the three or more plants. For example, the grow area can be located in a grow house which includes a building or housing that separates the grow area from the surrounding environment. That is, the grow house can include walls, roofs or other structures that prevent the outside weather from having an effect on the environment of the grow area.

FIG. 8 also shows that the method 800 can include placing 804 an array of light fixtures such that at least a portion of each of the light fixtures is at or below the top of the three or more plants and at least one of the light fixtures is positioned between at least two of the three or more plants. The array of light fixtures includes a number of individual light fixtures that are intended to stimulate growth of the plants. For example, the light fixtures should have a high enough intensity to that the plants can photosynthesize. Additionally or alternatively, the light fixtures should be low temperature fixtures, such as LEDs and compact fluorescents; otherwise they can overheat and damage the plants.

For example, the light fixtures can include one or more vertical rods. That is, each light fixture is a rod that radiates light in all horizontal directions. This means that light reaches the plants from multiple directions.

In order to stimulate growth of the plants, the light fixtures are positioned by the array of light fixtures vertically such that at least a portion of each of the light fixtures is at or below the top of the three or more plants. That is, at least some of the light emitting portion of the light fixture is below the top of each of the three or more plants. This allows the light to both reach leaves that are below the top of the plant, leaves which would receive little or no light in either a natural environment or a grow area with only overhead lights, and allows light to reach the bottom of upper leaves, which increases the photosynthesizing surface of the three or more plants.

Likewise, the light fixtures are located such that each plant is exposed to the light from at least two of the light fixtures and are arranged in a flanking pattern around each plant. This further increases the surface area of the three or more plants which is photosynthesizing. In particular, the light fixtures may provide 360 degrees of light to each of the three or more plants. This allows many of the plants "green" surfaces to continually photosynthesize, whereas in a natural environment some or all green surfaces are, at various times, not exposed to light and photosynthesis cannot occur.

Having three or more plants can be critical to maximize the use of light by the plants. That is, since many light fixtures will radiate light in multiple directions it is critical for the light fixtures to supply light to more than one plant. I.e., efficiency is maximized when as much light as possible from each light fixture reaches a plant. Therefore, having three or more plants allows for greater efficiency as a greater percentage of light fixtures are stimulating growth in multiple plants.

The system can include one or more supports. The supports are configured to allow the array of light fixtures to be hung from a ceiling. That is, the supports hang the array of light fixtures in the configuration described above. Additionally or alternatively, the supports can supply power to the array of light fixtures. For example, the supports can include ballast or other power source. Electrical ballast is a device intended to limit the amount of current in an electric circuit.

FIG. 8 additionally shows that the method can include providing 806 power to the light fixtures according to a predetermined schedule. Providing 806 power to the light fixtures allows them to produce light which can be used by the plants for photosynthesis. Additionally or alternatively, some plants need rest periods. I.e., the plants need periods where they are not receiving light. Therefore the predetermined schedule can include one or more "rest" periods where the light fixtures are turned off and the plants are not photosynthesizing.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lighting system for stimulating plant growth, the system comprising:
   three or more plants in a grow area, wherein the center of each of a first plant, a second plant and a third plant are not arranged linearly in any horizontal plane that intersects each of a stem of the first plant, a stem of the second plant, and a stem of the third plant;
   a first array of light fixtures;
   a second array of light fixtures;
   wherein:
      each of the light fixtures in the first array of light fixtures and second array of light fixtures:
         are positioned vertically such that at least a portion of each of the light fixtures is below the top of the three or more plants;
         are located such that each plant is exposed to the light from at least two of the light fixtures; and
         are arranged in a flanking pattern around each plant; and
      at least one of the light fixtures is positioned between at least two of the three or more plants; and
   a blade, wherein the blade:
      includes at least one of the light fixtures in the first array of light fixtures; and
   a support, the support including a track, wherein the track is configured to:
      receive the blade, wherein the weight of the blade:
         is borne by the support; and
         hangs from the support; and
      create an electrical connection between the support and the blade to connect the blade to a power supply, wherein the power supply provides electrical power to the light fixtures on the blade.

2. The system of claim 1, wherein:
   the track includes:

a first conducting strip with a first electrical polarity; and a second conducting strip with a second electrical polarity opposite the first electrical polarity.

3. The system of claim 2, wherein:
the first conducting strip and the second conducting strip each run the entire length of the track.

4. The system of claim 1, wherein the light fixtures in the array of light fixtures are configured as vertical rods of light.

5. The system of claim 4, wherein the blade includes a spacer, configured to position the vertical rods of light relative to one another.

6. The system of claim 4, wherein the illumination of vertical rods are controlled independently of one another.

7. The system of claim 4, further comprising:
a switch, the switch configured to control the power supplied to a single vertical rod.

8. The system of claim 1, wherein the lights on a first surface of the blade are controlled independently of the light fixtures on a second surface of the blade, wherein the second surface is opposite the first surface.

9. The system of claim 8, further comprising a switch, the switch configured to control the light fixtures on the first surface.

10. The system of claim 8, further comprising a second switch, the second switch configured to control the light fixtures on the second surface.

11. The system of claim 1, wherein each of the lights in each of the light fixtures in the array of light fixtures are LEDs.

12. The system of claim 1, wherein each of the lights in each of the light fixtures in the array of light fixtures are compact fluorescents.

13. The system of claim 1, wherein each of the lights in each of the light fixtures in the array of light fixtures are each low temperature lights, wherein said low temperature lights do not produce enough heat to damage the plants.

14. A lighting system for stimulating plant growth, the system comprising:
three or more plants in a grow area, wherein the center of each of a first plant, a second plant and a third plant are not arranged linearly in any horizontal plane that intersects each of a stem of the first plant, a stem of the second plant, and a stem of the third plant;
a first array of light fixtures;
a second array of light fixtures;
wherein:
each of the light fixtures in the first array of light fixtures and second array of light fixtures:
are positioned vertically such that at least a portion of each of the light fixtures is at or below the top of the three or more plants;
are located such that each plant is exposed to the light from at least two of the light fixtures;
are arranged in a flanking pattern around each plant such that each of the three or more plants continuously receives 360 degrees of light in a horizontal plane containing the array of light fixtures; and
are controlled independently of one another; and
at least one of the light fixtures:
is located between at least two of the three or more plants; and
provides light to at least two of the three or more plants;
a first blade, wherein the first blade:
includes;
at least some of the light fixtures in the first array of light fixtures;
a first conducting strip; and
a second conducting strip;
wherein the first conducting strip and the second conducting strip are configured to receive electrical power for the light fixtures in the first blade;
a second blade, wherein the second blade:
includes:
at least some of the light fixtures in the second array of light fixtures;
a first conducting strip; and
a second conducting strip;
wherein the first conducting strip and the second conducting strip are configured to receive electrical power for the light fixtures in the first blade;
a first support, the first support including a track, wherein the track:
is configured to:
receive the first blade, wherein the weight of the first blade:
is borne by the first support; and
hangs from the first support; and
create an electrical connection between the first support and the first blade to connect the first blade to a power supply, wherein the power supply provides electrical power to the light fixtures on the first blade; and
includes:
a first conducting strip with a first electrical polarity, the first conducting strip sized and shaped to approximately match a conducting strip on the first blade; and
a second conducting strip with a second electrical polarity opposite the first electrical polarity, the first second strip sized and shaped to approximately match a conducting strip on the second blade; and
a second support, the second support including a track, wherein the track:
is configured to:
receive the second blade, wherein the weight of the second blade:
is borne by the second support; and
hangs from the second support; and
create an electrical connection between the second support and the second blade to connect the second blade to the power supply, wherein the power supply provides electrical power to the light fixtures on the second blade; and
includes:
a first conducting strip with a first electrical polarity, the first conducting strip sized and shaped to approximately match a conducting strip on the first blade; and
a second conducting strip with a second electrical polarity opposite the first electrical polarity, the first second strip sized and shaped to approximately match a conducting strip on the second blade.

15. The system of claim 14, further comprising:
a grow house, the grow house comprising:
a housing, the housing configured to create an environment conducive to the growth of the three or more plants;
the grow area, the grow area configured to receive the three or more plants.

16. The system of claim 15, wherein:
the light fixtures are arranged symmetrically about each of the three or more plants.

17. The system of claim 14 further comprising:
a spacer, the spacer configured to maintain a desired distance between the first array of light fixtures and second array of light fixtures.

18. The system of claim 14 further comprising:
a daisy chain, the daisy chain configured to receive power from the first array of light fixtures and supply power to the second array of light fixtures.

19. The system of claim 14, wherein:
the first blade further includes:
 a control, wherein the control allows independent control of each of the light fixtures in the first blade; and
the second blade further includes:
 a control, wherein the control allows independent control of each of the light fixtures in the second blade.

20. A method for arranging plants and light fixtures to stimulate plant growth, the method comprising:
placing three or more plants in a grow area, wherein the center of each of a first plant, a second plant and a third plant are not arranged linearly in any horizontal plane that intersects each of a stem of the first plant, a stem of the second plant, and a stem of the third plant;
placing a first array of light fixtures;
placing a second array of light fixtures;
wherein:
 each of the light fixtures in the first array of light fixtures and second array of light fixtures:
  are positioned vertically such that at least a portion of each of the light fixtures is at or below the top of the three or more plants;
  are located such that each plant is exposed to the light from at least two of the light fixtures; and
  are arranged in a flanking pattern around each plant such that each of the three or more plants continuously receives 360 degrees of light in a horizontal plane containing the array of light fixtures; and
 at least one of the light fixtures:
  is located between at least two of the three or more plants; and
  provides light to at least two of the three or more plants;
placing a first blade, wherein the first blade:
 includes:
  at least some of the light fixtures in the first array of light fixtures;
  a first conducting strip; and
  a second conducting strip;
  wherein the first conducting strip and the second conducting strip are configured to receive electrical power for the light fixtures in the first blade;
placing a second blade, wherein the second blade:
 includes:
  at least some of the light fixtures in the second array of light fixtures;
  a first conducting strip; and
  a second conducting strip;
  wherein the first conducting strip and the second conducting strip are configured to receive electrical power for the light fixtures in the first blade; and
providing power to the light fixtures according to a predetermined schedule.

21. The method of claim 20, wherein the predetermined schedule includes at least one rest period per day.

* * * * *